(12) United States Patent
Li et al.

(10) Patent No.: US 9,704,227 B2
(45) Date of Patent: Jul. 11, 2017

(54) METHOD AND APPARATUS FOR IMAGE ENHANCEMENT

(71) Applicant: Nokia Technologies Oy, Espoo (FI)

(72) Inventors: Jiangwei Li, Beijing (CN); He Yan, Beijing (CN); Kongqiao Wang, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/784,281

(22) PCT Filed: Jul. 28, 2014

(86) PCT No.: PCT/FI2014/050594
§ 371 (c)(1),
(2) Date: Oct. 13, 2015

(87) PCT Pub. No.: WO2015/015051
PCT Pub. Date: Feb. 5, 2015

(65) Prior Publication Data
US 2016/0071253 A1    Mar. 10, 2016

(30) Foreign Application Priority Data

Jul. 29, 2013 (CN) .......................... 2013 1 0327358

(51) Int. Cl.
*G06T 5/20* (2006.01)
*G06K 9/40* (2006.01)
(Continued)

(52) U.S. Cl.
CPC ............ *G06T 5/20* (2013.01); *G06K 9/00624* (2013.01); *G06K 9/40* (2013.01); *G06T 5/002* (2013.01);
(Continued)

(58) Field of Classification Search
CPC ...... G06K 9/40; G06K 9/00624; G06T 5/004; G06T 5/002; G06T 5/20; G06T 5/50; G06T 2207/20224
(Continued)

(56) References Cited

U.S. PATENT DOCUMENTS 8,204,329 B2 * 6/2012 Zhang ..................... G06T 5/008
382/254
2011/0135200 A1 * 6/2011 Chen ....................... G06T 5/003
382/167
(Continued)

FOREIGN PATENT DOCUMENTS

CN          102999883 A       3/2013
CN          103065284 A       4/2013

OTHER PUBLICATIONS

International Search Report and Written Opinion received for corresponding Patent Cooperation Treaty Application No. PCT/FI2014/050594, dated Nov. 21, 2014, 15 pages.
(Continued)

*Primary Examiner* — Yon Couso
(74) *Attorney, Agent, or Firm* — Alston & Bird LLP

(57) ABSTRACT

Embodiments of the present invention relate to a method and apparatus for image enhancement. In particular, there is provided a method for image enhancement, the method comprising: estimating unsharpness of the image (S201-S204); determining a protection level of at least one pixel in the image based on the unsharpness (S205); and modifying a value of the at least one pixel to enhance the image, an amount of the modifying being determined at least in part based on the protection level (S206-S210). A corresponding apparatus and user device are disclosed. The invention may be applied to fog or haze removal from images or video without producing over-removal artifacts. In some embodi-
(Continued)

ments, the invention may also be used to remove noise from low-light images.

20 Claims, 6 Drawing Sheets

(51) Int. Cl.
    *G06T 5/00* (2006.01)
    *G06K 9/00* (2006.01)
    *G06T 5/50* (2006.01)
(52) U.S. Cl.
    CPC ............... *G06T 5/004* (2013.01); *G06T 5/50* (2013.01); *G06T 2207/20224* (2013.01)
(58) Field of Classification Search
    USPC ........................................................ 382/260
    See application file for complete search history.

(56) References Cited

U.S. PATENT DOCUMENTS

2012/0328205 A1    12/2012    Wen et al.
2013/0071043 A1     3/2013    Bai

OTHER PUBLICATIONS

He, K., et al. "Single Image Haze Removal Using Dark Channel Prior", IEEE Conference on Computer Vision and Pattern Recognition (CVPR'09) [online], Jun. 20, 2009 [retrieved on Jun. 17, 2014], pp. 1956-1963. Retrieved from the Internet: <URL:http://ieeexplore.ieee.org/xpl/articleDetails.jsp?arnumber=5206515>.

Office Action and Search Report for Chinese Patent Application No. 201310327358.0 dated Aug. 31, 2016, with English Summary 21 pages.
Dong, X. et al., *Fast Efficient Algorithm for Enhancement of Low Lighting Video*, IEEE Conf. Multimedia and Expo (2011) 6 pages.
Fattal, R., *Single Image Dehazing*, ACM Transactions on Traphics, vol. 27, No. 3, Article 72 (Aug. 2008) pp. 72:1-72:9.
He, K. et al., *Single Image Haze Removal Using Dark Channel Prior*, IEEE Transactions on Pattern Analysis and Machine Intelligence, vol. 33, No. 12 (Dec. 2011) 2341-2353.
Loza, A. et al., *Automatic Contrast Enhancement of Low-light Images Based on Local Statistics of Wavelet Coefficients*, Proceedings of 2010 IEEE $17^{th}$ International Conference on Image Processing (Sep. 2010) 3553-3556.
Malm, H. et al., *Adaptive Enhancement and Noise Reduction in Very Low Light-level Video*, Proc. IEEE Conf. International Conference on Computer Vision (2007) 8 pages.
Mittal, G. et al., *An Efficient Video Enhancement Method Using L\*A\*B Analysis*, Proc. of IEEE International Conference on Video and Signal Based Surveillance (2006) 5 pages.
Schwartz, S. et al., *Blind Haze Separation*, Proceedings of the 2006 IEEE Computer Society Conference on Computer Vision and Pattern Recognition (2006) 8 pages.
Tan, R., *Visibility in Bad Weather From a Single Image*, Proc. IEEE Conf. Computer Vision and Pattern Recognition (Jun. 2008) 8 pages.
Supplementary European Search Report for Application No. EP 14 83 2056 dated Feb. 7, 2017.
Kondratyev, K. et al., *Remote Sensing of the Earth From Spaced Atmospheric Correction* (Jan. 1, 1992) pp. 275-297.
Malm. W., *Visibility: The Seeing of Near and Distant Landscape Features* (Jan. 1, 2016) pp. 94-95.
Office Action for Chinese Application No. 201310327358.0 dated Apr. 19, 2017, 10 pages.

\* cited by examiner

METHOD AND APPARATUS FOR IMAGE ENHANCEMENT

RELATED APPLICATION

This application was originally filed as Patent Cooperation Treaty Application No. PCT/FI2014/050594 filed Jul. 28, 2014 which claims priority benefit to Chinese Patent Application No. 201310327358.0, filed Jul. 29, 2013.

FIELD

Embodiments of the present invention relate to the image processing, and more specifically, to a method and apparatus for image enhancement.

BACKGROUND

In past years, image capturing and processing technologies have significantly developed. At present, image capturing devices such as camera and video camera can already be integrated into various computing devices such as mobile phone, personal digital assistant (PDA), tablet computer, laptop computer and the like. In the current image capturing and processing technologies, one major challenge comes from the impact of the imaging case on image quality. For example, in a low-light environment or a foggy natural environment, the quality of the captured image would usually deteriorate significantly. For example, there might be scene blurring in the image.

Some solutions have been proposed to address this problem. For example, it has been proposed to capture a series of images using different parameters (e.g., exposure parameters, focal distance, etc.) each time when a user issues command of image capturing and to integrate these images to obtain a final image, thereby eliminating the negative impact caused by the low light. However, such method needs a higher computation cost, and not all image capturing devices allow control of parameters. More importantly, this solution cannot meet the requirement of real-time image enhancement. For example, although the quality of the final result may be enhanced, the quality of real-time image of the scene which is represented in the view-finder is not improved. Therefore, user experience during the image capturing process cannot be improved. Accordingly, such image enhancement solution is not suitable for real-time image/video enhancement.

Some other solutions solve this problem by virtue of computer software. For example, image quality in a low-light condition may be enhanced through improving the contrast of the image or video frame. Alternatively or additionally, a dedicated fog removal process or low light removal process may be performed so as to eliminate the foggy area or low-illumination area in the image based on an imaging model. However, images obtained by such method usually contain remarkable noises and are unstable. For example, the scale-like visual effects would probably be produced in the area subject to fog removal or low light removal, which introduces new noise during the image enhancement process. Such phenomenon may be referred to as "over-removal", which causes the result of image enhancement unstable and unreliable and will affect the visual effect of the resulting image.

In view of the above, this field needs an image enhancement technology suitable for real-time image enhancement and meanwhile avoids over-removal.

SUMMARY

In order to overcome the above problem in the prior art, the present invention provides a method and apparatus for image enhancement.

According to one aspect of the present invention, there is provided a method for image enhancement. The method comprises: estimating unsharpness of the image; determining a protection level of at least one pixel in the image based on the unsharpness; and modifying a value of the at least one pixel to enhance the image, wherein an amount of the modifying is determined at least in part based on the protection level.

According to another aspect of the present invention, there is provided an apparatus for image enhancement. The apparatus comprises: an unsharpness estimating unit configured to estimate unsharpness of the image; a modification protection unit configured to determine a protection level of at least one pixel in the image based on the unsharpness; and an image enhancing unit configured to modify a value of the at least one pixel to enhance the image, wherein an amount of the modifying is determined at least in part based on the protection level.

It would be understood through the following description that according to embodiments of the present invention, when performing enhancement to an image, the unsharpness (e.g., density of fog, darkness, etc.) in the image is quantitatively taken into consideration. In this way, in the image enhancement, a modification amount for any given pixel in the image can be adaptively determined at least in part based on the overall unsharpness of the image. Furthermore, in some optional embodiments, the modification amount may also depend on whether the modified pixel is located in an unsharpness area. According to embodiments of the present invention, for an image with heavy fog and/or very dark light, the strength of image enhancement will be reduced accordingly. In this way, the over-removal in the enhanced image can be effectively avoided, thereby obtaining a more vivid, natural and acceptable visual effect. Moreover, embodiments of the present invention are applicable for real-time image enhancement, such that the user may have a more intuitive and convenient control to the image capturing process while obtaining an image of better quality.

DESCRIPTION OF THE DRAWINGS

The above and other objectives, features and advantages of embodiments of the present invention will become more comprehensible through reading the following detailed description with reference to the accompanying drawings. In the drawings, several embodiments of the present invention are illustrated in exemplary, not restrictive, manner. In the accompanying drawings.

Throughout the drawings, same or corresponding reference numerals indicate the same or corresponding parts.

DETAILED DESCRIPTION

The principle and spirit of the present invention will be described with reference to several exemplary embodiments shown in the accompanying drawings. It should be understood that these embodiments are described only for enabling those skilled in the art to better understand and implement the present invention, not intended to limit the scope of the present invention in any manner.

Figure 1:
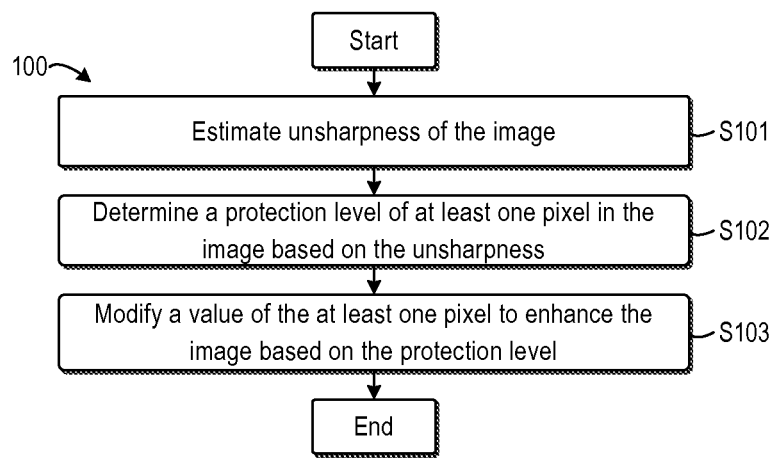
FIG. 1 illustrates a flow chart of a method for enhancing an image according to exemplary embodiments of the present invention.

Reference is first made to FIG. 1, in which a flow chart of a method 100 for image enhancement according to one exemplary embodiment of the present invention is presented. Please note that in the context of the present application, the term "image" may be a static image or an image (i.e., frame) in a moving image (e.g., video). The image may be captured using an appropriate capturing device/means, and may be stored and processed in any appropriate format. The scope of the present invention is not limited in this regard.

As shown, the method 100 is entered at step S101 where the unsharpness of an image being processed is estimated. As used herein the term "unsharpness" refers to the degree of indistinct or blur in an image caused, for example, by the environmental factors when the image is captured. It would be appreciated that various factors such as fog, haze, smog, rain and snow, low-light and the like may cause blur in the image. Conventionally, the image enhancement process does not take into account the unsharpness in the image in a quantitative way, thereby causing occurrence of phenomena such as over-removal. In contrast, according to embodiments of the present invention, the overall unsharpness of the image is estimated quantitatively so as to enhance the image sharpness while avoiding over-removal.

For the convenience of discussion, in the description below, "fog density" may be used as an example of unsharpness. However, it is only exemplary, without suggesting any limitations on the scope of the present invention. It would be appreciated that various embodiments described hereinafter with reference to fog density are likewise suitable for image blur caused by other factors. For example, the unsharpness caused by low-light condition is referred to as darkness. According to embodiments of the present invention, darkness may be converted into fog density, and the image enhancement may be realized by fog removal processing. For example, an image captured in a low-light condition may be inverted to convert the low-light area into a high-brightness area. At this point, the high-brightness area may be regarded as a foggy area. In this way, the darkness of the original image may be indicated by fog density of the inverted image.

According to embodiments of the present invention, at step S101, various manners may be utilized to estimate the image sharpness of the image. With fog density as an example, the brightness of pixels in a foggy area in the image is always higher than pixels in other areas. Therefore, in some embodiments, an average color value of a plurality of pixels (e.g., the brightest top 20% pixels) whose brightness in the image is higher than a predetermined threshold may be defined as fog density. Please note that it is only exemplary. Any currently known or future developed appropriate methods may all be used to estimate the fog density in the image. Other exemplary embodiments in this regard will be described in detail hereinafter.

Next, the method 100 proceeds to step S102, where a protection level of at least one pixel in the image is determined based on the unsharpness of the image determined at step S101. Here, the "at least one pixel" refers to a pixel(s) whose value will be changed in the image enhancement. In these embodiments, the protection level may be determined with respect to all of the pixels in the image. Alternatively, the protection levels of pixels in some specific areas in the image. Such an area may be automatically determined or manually specified by the user. The scope of the present invention is not limited in this regard.

As used herein the term "protection level" refers to the processing strength or amplitude with respect to the associated pixel in image enhancement. The processing strength is reduced with the protection level increases. According to embodiments of the present invention, in general, the protection level for each pixel in the image increases as the overall unsharpness of an image increases. In this way, for an image captured in a thin fog condition, the fog removal process will be performed with relatively large amplitude, thereby improving the sharpness of a scene in the image. On the other hand, for an image captured in a heavy fog condition, the fog removal process will be performed with relatively smaller amplitude, thereby preventing occurrence of over-removal like in the conventional solutions. According to embodiments of the present invention, any appropriate increasing function may be utilized to establish the correlation between the unsharpness and the protection levels of pixels in the image, such that the pixel protection level increases with increase of the image unsharpness. For example, piecewise function, step function, linear function, index function, logarithm function, and the like, may be used in conjunction with embodiments of the present invention. Several embodiments in this regard will be described in detail later.

Alternatively or additionally, according to embodiments of the present invention, the protection level of pixel may also be associated with the relationship between the pixel and the overall unsharpness of the image. For example, for a given fog density, if the difference between the value of a pixel and the density of fog is relatively small, it may indicate that the pixel is more likely to be located in a foggy area, resulting in a higher protection level. On the contrary, if the difference between the value of a pixel and the density of the fog is relatively large, it may indicate that the pixel is less likely to be located in the foggy area, resulting in a lower protection level. In this way, the pixels in a foggy or heavy-fog area may be processed in a weaker strength, while the pixels in a fogless or thin-fog area may be processed in a relatively large strength.

Next, at step S103, the image enhancement processing is performed to at least one pixel in the image. In an image enhancement process such as fog removal and low light removal, values of relevant pixels will be changed to raise the sharpness of the image. In particular, according to embodiments of the present invention, an amount of modifying the pixel is at least in part determined by the protection level determined at step S102. With fog removal as an example, as stated above, the amount of pixel modification may decrease as the protection level increases. On the contrary, the amount of pixel modification may increase as the protection level decreases.

In the embodiment as depicted in FIG. 1, the method 100 ends after step S103. According to embodiments of the present invention, the unsharpness (e.g., fog density) of an image is introduced into a process of image enhancement (e.g., fog removal processing). Therefore, according to embodiments of the present invention, the processing strength of each pixel may be dynamically and adaptively determined based on the overall unsharpness of the image and the area where the pixel is located. In this way, an appropriate tradeoff may be achieved between image enhancement and visual effect, thereby achieving a more vivid, natural and acceptable visual effect.

Figure 2:
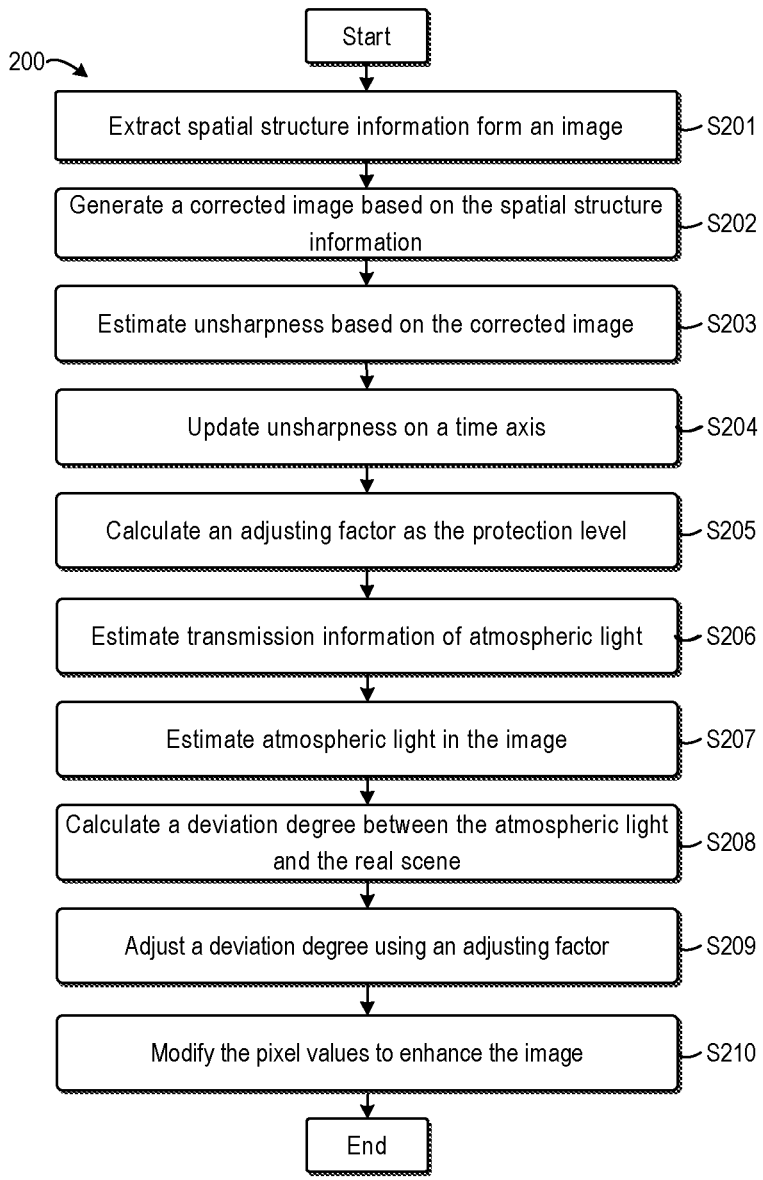
FIG. 2 illustrates a flow chart of a method for enhancing an image according to another exemplary embodiment of the present invention.

FIG. 2 shows a method 200 for image enhancement according to another exemplary embodiment. The method 200 may be regarded as a kind of specific implementation of the method 100 as described above with reference to FIG. 1. As shown, after the method 200 starts, at steps S201-S203, unsharpness of the image to be enhanced is estimated. In other words, steps S201-S203 correspond to step S101 in method 100 as described above in terms of functions.

Specifically, at step S201, the spatial structure information is extracted from the image. According to embodiments of the present invention, the spatial structure information is for describing structural features of a scene contained in the image. In some embodiments, the extraction of spatial structure information may be implemented by applying edge extraction on the image. In other words, edge information in the image may be used as the structure information. In this regard, any currently known or future developed edge extracting algorithm may be used in conjunction with embodiments of the present invention.

Figure 3:
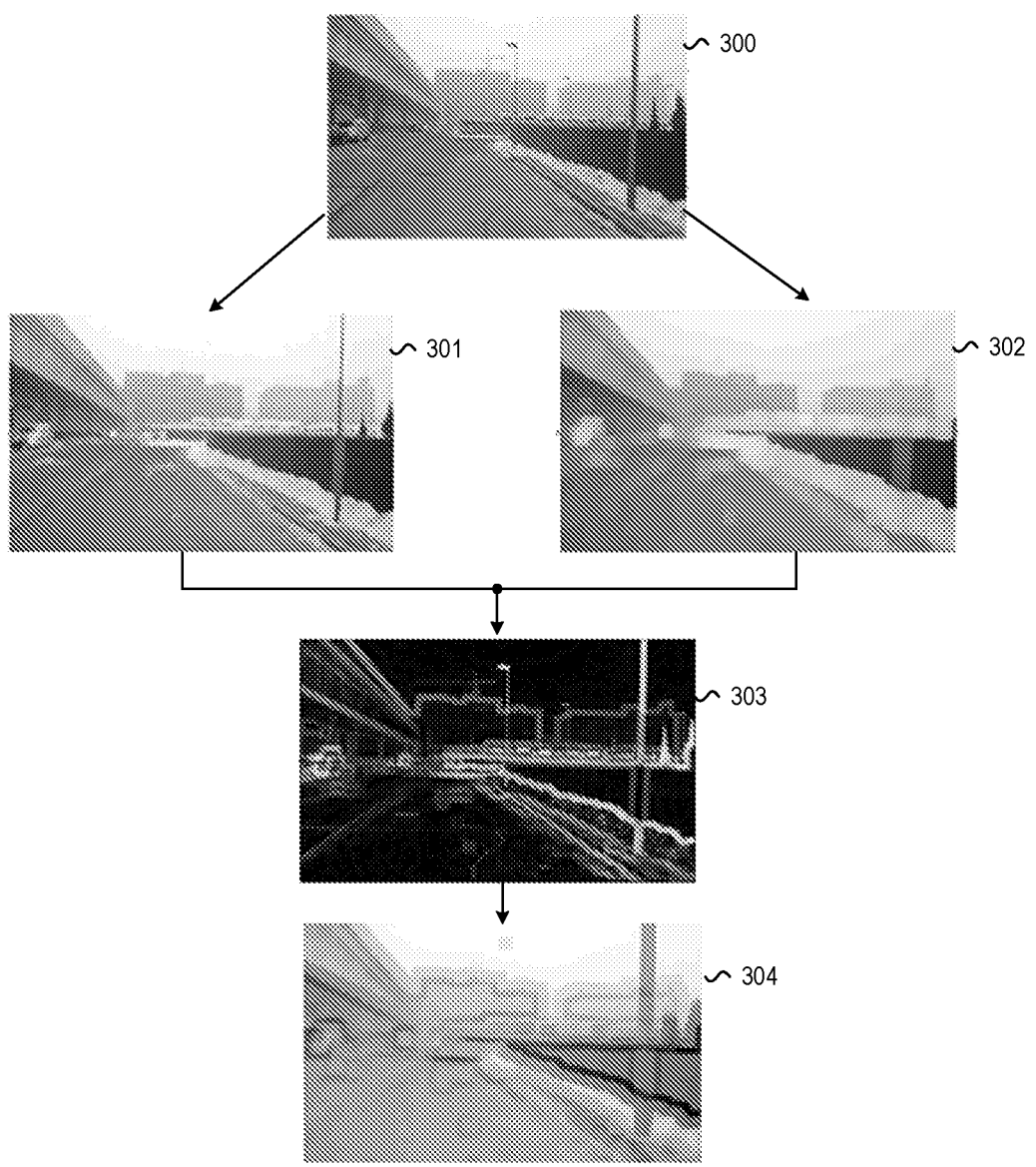
FIG. 3 illustrates a schematic diagram of estimating an unsharpness of an image according to exemplary embodiments of the present invention.

Additionally or alternatively, filtering processes with different sizes may be executed on the image so as to realize extraction of structure information. For example, as shown in FIG. 3, a first filter of a first size may be used to filter an original image 300 to obtain a first intermediate image 301. Additionally, a second filter of a second size is used to filter the original image 300 to obtain a second intermediate image 302, wherein the second size is larger than the first size. In other words, compared with the first filter, the second filter is a large scale filter. According to embodiments of the present invention, the first filter and the second filter, for example, may be a linear filter, a Gaussian filter, or the like. Then, the difference between the first intermediate image 301 and the second intermediate image 302 is calculated to obtain a differential image 303. Information included in the differential image 303 may be used as the spatial structure information of the scene in the original image 300. Other method of extracting structure information from the image is also feasible, and the scope of the present invention is not limited in this regard.

Next, at step S202, a corrected image is generated based on the original image and the spatial structure information extracted at step S201. For example, in some embodiments, the corrected image may be obtained by removing spatial structure information from the original image 300. Still with reference to FIG. 3, it is possible to generate the corrected image 304 by subtracting the differential image 302 from the original image 300. Alternatively, the corrected image may be generated by removing the spatial structure information from a derived image of the original image. For example, in some embodiments, the corrected image 304 may be generated by subtracting the differential image 303 from the second intermediate image 301 (an intermediate image derived through the second filter of a larger size). Other embodiments are also feasible, and the scope of the present invention is not limited thereto.

Next, at step S203, unsharpness of the original image is estimated based on the corrected image. For example, pixels whose brightness is higher than a threshold in the corrected image may be selected. The threshold may be determined in advance or dynamically. By way of example, it is possible to select a particular number of brightest pixels in the image, for example, the 20% brightest pixels. An average of the values of the selected pixels (e.g., value in one or more color channels) is calculated as the value of the unsharpness of the image.

It can be seen that at steps S201-S203 as described above, the structure information in the original image 300 is removed in the corrected image 304. In this way, The unsharpness of the image will not be over-estimated due to some objects in light colors existing in the foreground structure. In this way, compared with directly estimating the unsharpness of the original image, the estimated unsharpness can better reflect the environmental factors when the original image is captured.

Still with reference to FIG. 2, if the currently processed image is a frame in a motion pictures (e.g., video), according to some optional embodiments, the unsharpness of at least one previous frame in a video may be utilized at step S204 to update the unsharpness of the current image. Such update on time axis helps to improve the continuity and smoothness of unsharpness. Specifically, suppose the estimated unsharpness of the current image is $D_t$, then the $D_t$ may be updated as follows:

$$D_t = (1-\eta) \cdot D_{t-1} + \eta \cdot D_t \qquad (1)$$
$$= (1-\eta)^{t-1} \cdot D_1 + \eta \cdot \sum_{i=2}^{t}(1-\eta)^{t-i} \cdot D_i$$

wherein $D_i$ represents the previously calculated unsharpness (I=2, . . . , t) of the ith frame in the video, and $\eta$ represents the smoothing parameter which may range in [0, 1] (for example, which may be 0.5). Through such smoothing on time axis, it may be avoided that estimation of the image unsharpness jumps between video frames.

Next, the method 200 proceeds to step S205, where a protection level of at least one pixel in the image is determined. It would be appreciated that step S205 as described here is a specific implementation of step S102 in method 100 as described above with reference to FIG. 1. Specifically, at step S205, for any given pixel in the image, an adjusting factor for the pixel may be calculated based on the value of the pixel and the unsharpness estimated at step S203. According to embodiments of the present invention, the adjusting factors will be used to control the processing strength for associated pixels during the image enhancement process.

In some embodiments, for the pixel (x,y) in the image, its adjusting factor may be calculated as follows:

$$coff_j(x, y) = \frac{|G_{t,j}(x, y) - D_t|}{|D_t - \delta|} \qquad (2)$$

wherein j represents a color channel, for example, j∈{R, G, B} in the RGB (red, green, blue) color space; $G_{t,j}(x,y)$ represents an initial value of the pixel in the color channel j; $D_t$ represents the unsharpness of the image; and δ is an prior coefficient representing the sharpness. It is to be understood that in this embodiment, the range of the adjusting factor ranges between [0, 1].

Still consider the example of a foggy image, wherein $D_t$ indicates the density of the fog, while the coefficient δ is a pixel value of an image captured under a clean and fogless condition. For example, in some embodiments, δ may be 128 or any other appropriate value. It would be appreciated that the adjusting factor coff as derived from equation (2) is inversely proportional to the density of the fog, while in direct proportion to the difference between the value of the current pixel and the density of the fog. Therefore, the adjusting factor not only indicates the density degree of the fog in the image, but also represents the probability that the current pixel is located in an unclear area in the image (i.e., whether the pixel is located in a foggy area or a fogless area). In these embodiments, the adjusting factor may serve as the protection level of the pixel and be used for adjusting the processing strength for the pixel during pixel enhancement, as described in detail below.

Still with reference to FIG. 2, in some optional embodiments, at step S206, the transmission information of atmospheric light at a given pixel in the image. In this regard, various currently known or future developed methods may be used to estimate transmission information of atmospheric light at a pixel. For example, in some embodiments, a transmission map may be obtained based on the original image. The value of each point in the transmission map reflects the atmospheric light transmission condition of a corresponding pixel in the original image. As an example, the transmission map may be roughly estimated by optimizing the imaging model based on dark channel prior to albedo estimation. Various methods of obtaining the transmission map are known in the art, which will not be detailed here.

Next, in some optional embodiments, the method 200 proceeds to step S207, where atmospheric light of the image is estimated. As known, the atmospheric light forms the basis of the visual effect of human beings, and visual effects caused by nature factors such as fog are essentially formed by absorption and diffusion of the atmospheric light. When estimating the atmospheric light, in some embodiments, the value of a pixel with the highest brightness in the image may be directly taken as the value of atmospheric light. Alternatively, in order to exclude the impact of some light-colored (e.g., white) objects in the scene so as to further improve the accuracy of atmospheric light, the atmospheric light may be estimated based on a plurality of random seeds. Specifically, at first, M seeds (M is any natural number greater than 1, e.g., 50) are randomly placed in the image, wherein each seed is represented by a polygon, for example, a rectangle of a (m/2)*(n/2). For each seed, the minimum values $c_i$ of respective color channels (e.g., R, G and B channels) of each pixel within the associated rectangle are obtained, and an average $\bar{c}$ of all $c_i$ of that seed is calculated. Then, a seed with the largest average $\bar{c}$ is selected from the M seeds, and the other M−1 seeds are discarded. For the selected seed, M seeds are randomly placed again in its associated rectangle, and the rectangle frame for each seed is narrowed to (m/4)*(n/4), for example. The seed selection process based on the average color value is repetitively iterated, until the size of the associated rectangles of the seeds is below a predetermined threshold. The value (e.g., color value) of the pixel with the largest gray value in the rectangle of the remaining seed is selected as the value of atmospheric light in the image.

In some optional embodiments, if the current image is a frame in a video, then the atmospheric light estimated at step S207 may be updated based on the atmospheric light of at least one previous frame in the video:

$$A_{t,j} = (1-\eta) \cdot A_{t-1,j} + \eta \cdot A_{t,j} \qquad (3)$$
$$= (1-\eta)^2 \cdot A_{t-2,j} + (1-\eta) \cdot \eta \cdot A_{t-1,j} + \eta \cdot A_{t,j}$$
$$= (1-\eta)^{t-1} \cdot A_{1,j} + \eta \cdot \sum_{i=2}^{t} (1-\eta)^{t-i} \cdot A_{i,j}$$

Wherein $A_{i,j}$ (i=2, . . . , t) represents the value of the atmospheric light of the ith frame in the color channel j, η represents the smooth coefficient, which may range from 0 to 1 and may be set to 0.5, for example. Through such smoothness on the time axis, discontinuity of estimation of the atmospheric light between video frames may be avoided.

Please note that the step S207 is optional. In some embodiments, the value of atmospheric light may be predetermined or user-inputted. Besides, in an embodiment of calculating the atmospheric light, it does not necessarily utilize the atmospheric light of a previous image to perform update and smoothness in time.

Return to FIG. 2, at step S208, a deviation degree between the atmospheric light of the image and the real scene radiance is calculated based on the value of the pixel, the unsharpness of the image and the transmission information of the atmospheric light. For example, in some embodiments, the deviation degree of the atmospheric light associated with the pixel (x,y) may be calculated as follows:

$$\frac{G_{t,j}(x,y) - D_t}{P_t(x,y)} \qquad (4)$$

wherein $G_{t,j}(x,y)$ represents the value of the pixel (e.g., the value in the color channel j), whose range is, for example, between [0, 255]; $D_t$ indicates unsharpness of the image; $P_t(x,y)$ represents the atmospheric light transmission information at the pixel. Please note that it is only an example, and any appropriate function may be employed to characterize the relationship between the deviation degree of the atmospheric light at a pixel and the unsharpness of the image and/or the value of that pixel. The scope of the present invention is not limited in this regard.

Then at step S209, the deviation degree of the atmospheric light calculated at step S208 is adjusted using the adjusting factor calculated at step S205. For example, in some embodiments, the adjustment of the deviation degree of the atmospheric light may be realized as follows:

$$\frac{G_{t,j}(x,y) - D_t}{P_t(x,y)} \cdot coff_i(x,y) \qquad (5)$$

As described above, in the embodiment as described in FIG. 2, the adjusting factor essentially represents the protection level of the pixel. Therefore, when the unsharpness in the image is relatively high and/or the probability that the pixel being considered falls in an unclear region is relatively large, the deviation degree will be significantly reduced. Accordingly, the amplitude for modification of the pixel in the image enhancement processing will be small, as discussed above.

The method 200 then proceeds to step S210, where the value of the pixel is modified based on the adjusted deviation degree and the atmospheric light to achieve enhancement of the original image. For example, in some embodiments, the modification to the pixel value may be implemented as follows:

$$G'_{t,j}(x, y) = \frac{G_{t,j}(x, y) - D_t}{P_t(x, y)} \cdot \text{coff}_j(x, y) + A_{t,j} \quad (6)$$

wherein $G'_{t,j}(x,y)$ is the modified value of the pixel in the color channel j, whose value may range, for example, in [0, 255]. It would be appreciated that according to equation (6), the image enhancement such as fog removal is implemented by approximating $A_{t,j}$ by the term $(G_{t,j}(x,y)-D_t)/P_t(x,y)$. In this way, the value of the pixel may be modified adaptively based on the transmission of the atmospheric light at the pixel and the deviation between such transmission and the real scene radiance. Specifically, the amount of modification for the pixel value may be determined based on the unsharpness (e.g., fog density) in the image and the probability that the pixel is in an unclear area (e.g., foggy area). As a result the over-removal can be effectively avoided.

Still consider fog removal as an example, and suppose that $\delta=128$ in equation (2) for calculating the adjusting factor, which means that the image might be rather clear without fog. At this point, the value of the pixel may be modified with a greater amount. Otherwise, if $D_t \gg 128$, it indicates that heavy fog might exist in the image. Hence, more pixels satisfying $G_{t,j}(x,y) \in [D_t-|D_t-128|, D_t+|D_t-128|]$ will be faded by the adjusting factor to ensure that the amount of modification in the image enhancement will not be too much. Moreover, for any given fog density, the area in which the pixel values are close to $D_t$ will not be enhanced too much, thereby preventing over-removal.

The method 200 ends after step S210. Please note that several steps in the method 200 may be omitted, as stated above. Moreover, the sequence of method steps will not be restricted. For example, the atmospheric, the transmission of the atmospheric light, and the calculation of the adjusting factor may be executed in any sequence or even executed concurrently. It should be also noted that various features as described with reference to FIG. 2 are merely exemplary. For example, although color channel is described above with reference to the RGB color model, those skilled in the art would understand that the scope of the present invention will not be restricted in this regard. Any currently known or future developed appropriate color channel may be used in conjunction with the embodiments of the present application.

Figure 4:
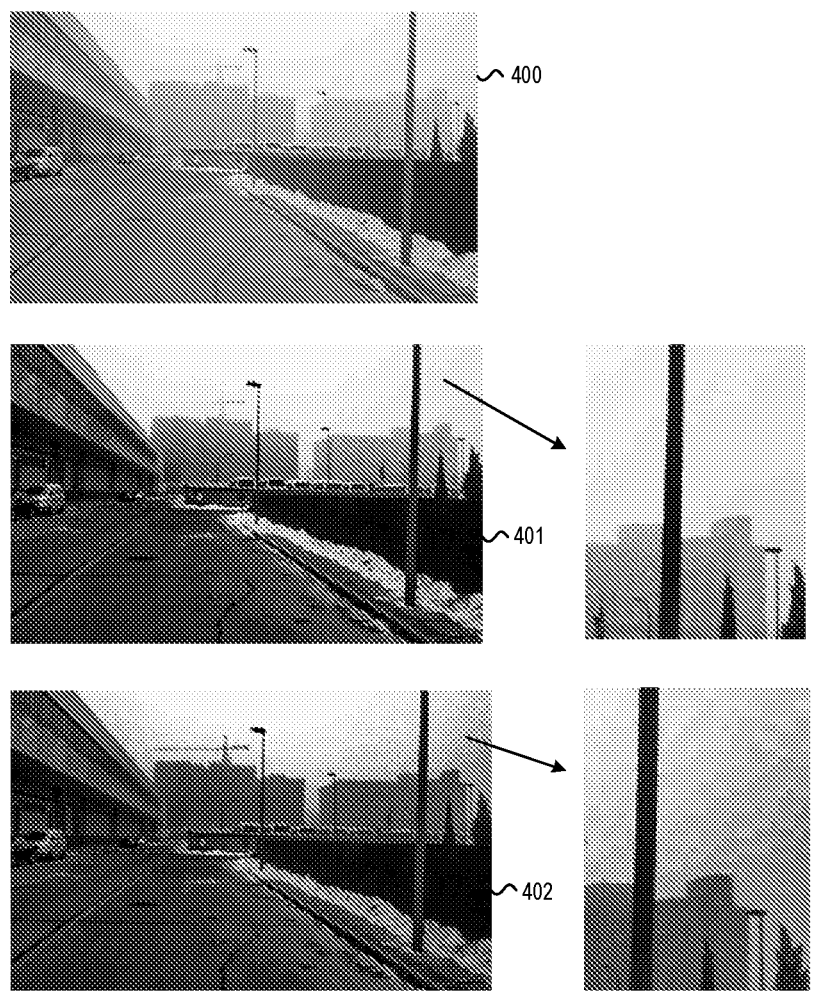
FIG. 4 illustrates a schematic diagram of performing fog-removal processing according to the exemplary embodiments of the present invention and the tradition method, respectively.

Refer to FIG. 4, in which an example of performing image enhancement according to embodiments of the present invention is presented. In FIG. 4, images 401 and 402 are images resulting from performing fog removal processing to the image 400 captured under a foggy condition according to embodiments of the present invention and the traditional method, respectively. According to the conventional solutions, the unsharpness (fog density in this example) of the image is not taken into account. Rather, the value of the brightest pixel in the image is simply estimated as atmospheric light. It can be seen that the image 402 resulting from such conventional solutions contains an apparent scale-like feature, which dampens the overall visual effect of the image. On the contrary, in the image 401 resulting from processing according to embodiments of the present invention, a good balance is achieved between image enhancement and visual effect.

Figure 5:
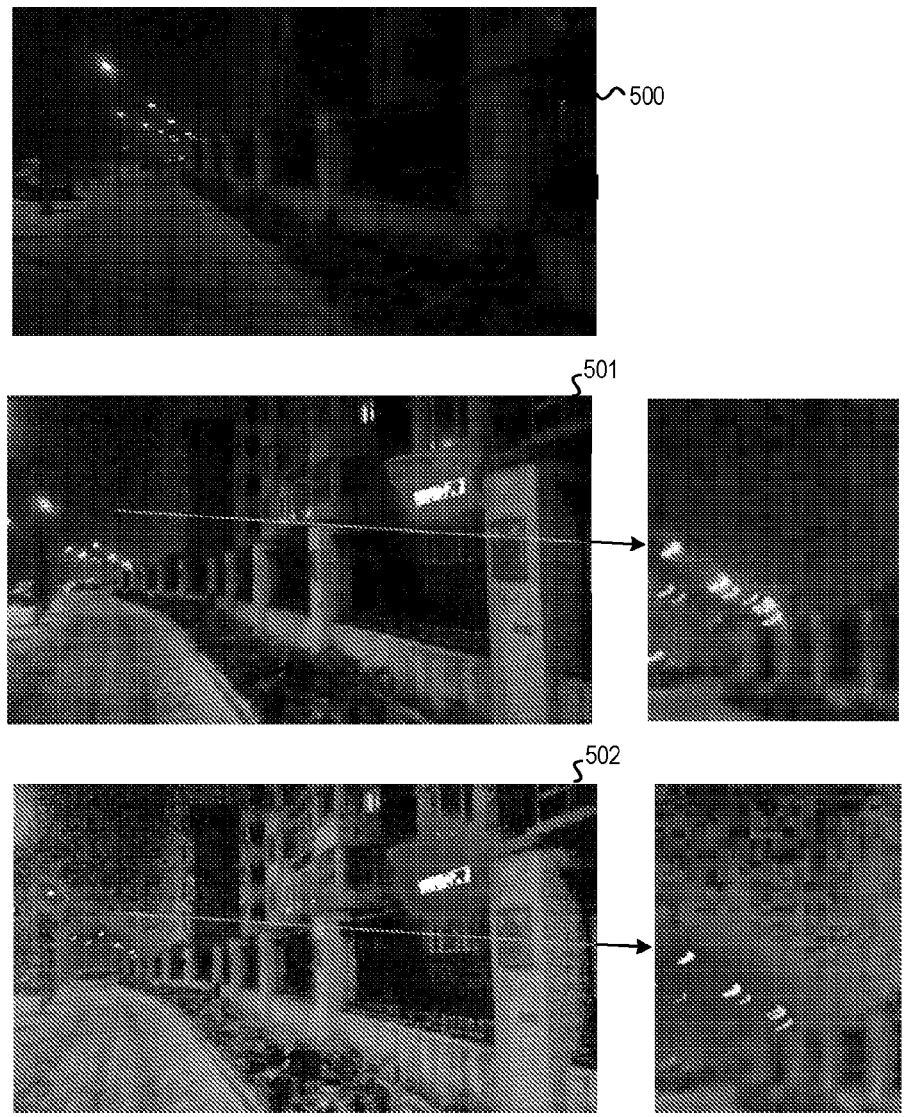
FIG. 5 illustrates a schematic diagram of performing low light removal processing according to the exemplary embodiments of the present invention and the tradition method, respectively.

FIG. 5 shows another example of performing image enhancement according to embodiments of the present invention. In FIG. 5, images 501 and 502 are images resulting from performing low light removal processing to the image 500 that is captured under a low light condition according to embodiments of the present invention and the traditional method, respectively. It may be seen that the resulting image 501 after being subject to low light removal according to embodiments of the present invention has a better visual effect.

Figure 6:
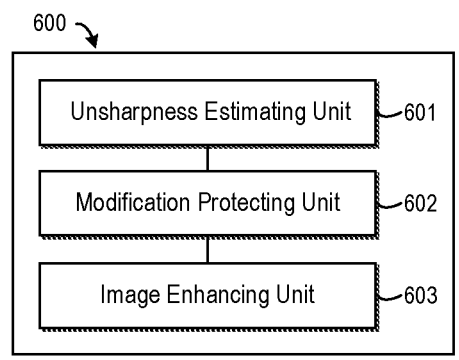
FIG. 6 illustrates a block diagram of an apparatus for enhancing an image according to the exemplary embodiments of the present invention.

Now, refer to FIG. 6, in which a block diagram of an apparatus 600 for image enhancement according to one exemplary embodiment of the present invention is presented. As shown in the figure, the apparatus 600 comprises: an unsharpness estimating unit 601 configured to estimate unsharpness of the image; a modification protecting unit 602 configured to determine a protection level of at least one pixel in the image based on the unsharpness; and an image enhancing unit 603 configured to modify a value of the at least one pixel to enhance the image, wherein an amount of the modifying is determined at least in part based on the protection level.

In some embodiments, the apparatus 600 may further comprise: a structure extracting unit configured to extract spatial structure information from the image. In these embodiments, the unsharpness estimating unit 601 may be further configured to estimate the unsharpness based on the image and the spatial structure information. Moreover, the apparatus 600 may further comprise: a first filtering unit configured to filter the image to obtain a first intermediate image utilizing a first filter of a first size; and a second filtering unit configured to filter the image to obtain a second intermediate image using a second filter of a second size, the second size being greater than the first size. At this point, the structure extracting unit may be configured to calculate a difference between the first intermediate image and the second intermediate image as the spatial structure information. Correspondingly, the unsharpness estimating unit 601 may be configured to remove the spatial structure information from the second intermediate image to generate a corrected image, and calculate an average of pixels with brightness greater than a threshold in the corrected image as the unsharpness.

In some embodiments, the image being processed may be a frame in the video. At this point, the apparatus 600 may further comprise: an unsharpness updating unit configured to update the unsharpness of the image utilizing the unsharpness of at least one frame before the image in the video.

In some embodiments, the modification protecting unit 602 may comprise: an adjusting factor calculating unit configured to calculate an adjusting factor for the at least one pixel based on the value of the at least one pixel and the unsharpness, the adjusting factor at least indicating a probability of the at least one pixel belonging to the unclear area in the image. in these embodiments, the apparatus 600 may further comprise: a transmission estimating unit configured to estimate the transmission information of the atmospheric light at the at least one pixel; a deviation calculating unit configured to calculate a deviation degree between the atmospheric light at the at least one pixel and a real scene radiance based on the value of the at least one pixel, the unsharpness and the transmission information; and an adjusting unit configured to adjust the deviation degree using the adjusting factor. Correspondingly, the image enhancing unit 603 is configured to modify the value of the at least one pixel based on the adjusted deviation degree and the atmospheric light.

In some embodiments, the apparatus 600 may further comprise: an atmospheric light estimating unit configured to iteratively estimate atmospheric light in the image using a plurality of seeds randomly distributed in the image for the modifying of the value of the at least one pixel. Optionally, if the image is a frame in a video, the apparatus 600 may further comprise: an atmospheric light updating unit configured to update the atmospheric light of the image by utilizing the atmospheric light in at least one frame before the image in the video.

As stated above, in some embodiments, the unsharpness of an image refers to fog density or darkness in the image.

It should be understood that for the clarity purpose, FIG. 6 does not show optional units or sub-units contained in apparatus 600. It is to be understood that all features described with respect to FIGS. 1 and 2 are also applicable to apparatus 600. Moreover, the term "unit" used here may be a hardware module or a software unit module. Accordingly, apparatus 600 may be implemented in various forms. For example, in some embodiments apparatus 600 may be implemented using software and/or firmware partially or completely, e.g., implemented as a computer program product embodied on a computer readable medium. Alternatively or additionally, apparatus 600 may be implemented partially or completely based on hardware, for example, implemented as an integrated circuit (IC) chip, application-specific integrated circuit (ASIC), system on chip (SOC) or field programmable gate array (FPGA). The scope of the present invention is not limited in this regard.

Figure 7:
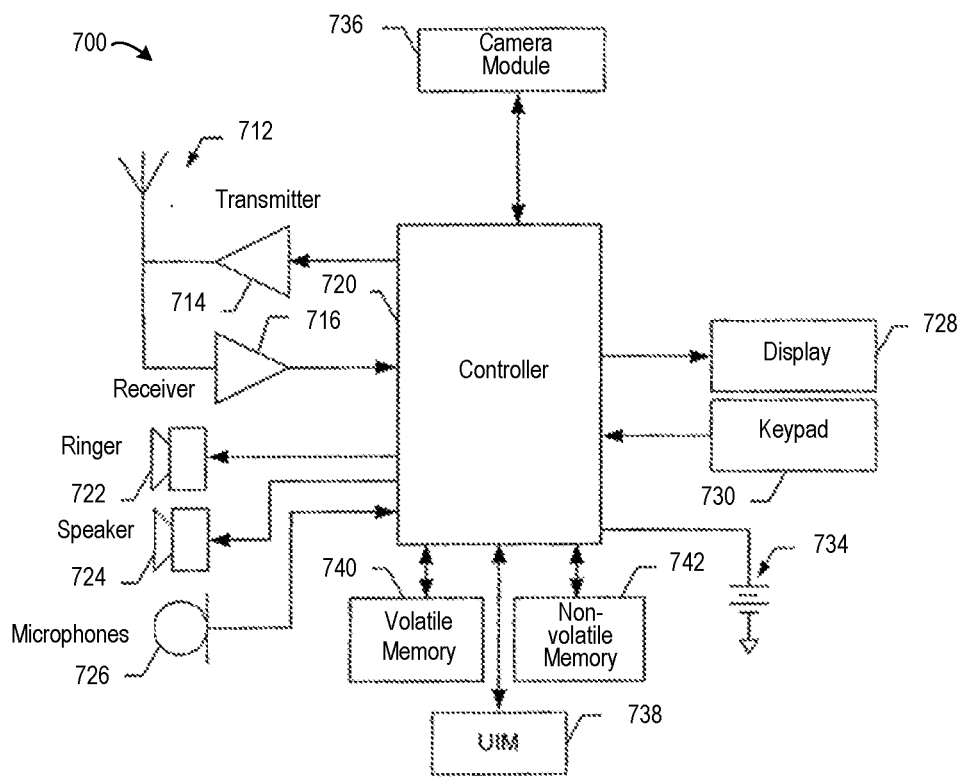
FIG. 7 illustrates a schematic block diagram of a user equipment according to exemplary embodiments of the present invention.

Now, refer to FIG. 7, in which a block diagram of an exemplary user equipment 700 in which the exemplary embodiments of the present invention may be implemented is presented. The user equipment 700 may a mobile device with an unlimited communication capability. However, it should be understood that it is only exemplary and non-restrictive. Other user equipment types may also easily employ embodiments of the present invention, such as a portable digital assistant (PDA), a pager, a mobile computer, a mobile TC, a gaming device, a laptop, a camera, a video camera, a GSP device and other type of voice and textual communication system. A fixed type of user equipment may likewise simply use embodiments of the present invention.

The user equipment 700 may comprise one or more antennas 712 in operable communication with a transmitter 714 and a transceiver 716. The user equipment 700 further comprises at least one processor controller 720. It should be understood that the controller 720 comprises a circuit required for performing the functions of the mobile terminal 700. For example, the controller 720 may comprise a digital signal processor device, a microprocessor device, an A/D converter, a D/A converter, and other support circuits. The control and signal processing functions of the apparatus 700 are allocated based on respective capabilities of these devices. The user equipment 700 may also comprise a user interface, for example, may comprise a ringer 722, a speaker 724, a loudspeaker 726, a display 728, and a keypad 730, all of which are coupled to the controller 720.

The user equipment 700 may also comprise a camera module 736. According to embodiments of the present invention, the camera module 736 at least may comprise an image capturing module for capturing a static image and/or a dynamic image, and an image enhancement apparatus (e.g., apparatus 600) as described above. Of course, the image enhancement apparatus may also be located in the user equipment 700 independent of the camera module 736. The scope of the present invention is not limited in this regard.

The user equipment 700 further comprises a battery 734, such as a vibration battery pack for supplying power to various circuits needed for operating the mobile terminal 700, and alternatively providing a mechanical vibration as a detectable output. The user equipment 700 further comprises a user identification module (UIM) 738. The UIM 738 is generally a memory device having an inbuilt processor. The UIM 738 may for example comprise a subscriber identification module (SIM), a universal integrated circuit card (UICC), a universal subscriber identification module (USIM) or a removable user identification module (R-UIM), etc. The UIM 738 may comprise a card connection detection module according to embodiments of the present invention.

The user equipment 700 may further comprise a memory. For example, the user equipment 700 may comprise a volatile memory 740, e.g., a volatile random access memory (RAM) for temporarily storing data in a cache area. The user equipment 700 may further comprise other non-volatile memory 742 which may be embedded or mobile. The non-volatile memory 742 may be additionally or alternatively comprise an EEPROM and a flash memory, and the like. The memory may store a random item in a plurality of information segments and the data used by the user equipment 700, so as to perform the functions of the apparatus 700. It should be understood that the structural block diagram in FIG. 7 is only for illustration purposes, not intended to limit the scope of the present invention. In some cases, some devices may be increased or decreased as required.

For the purpose of illustration only, several exemplary embodiments of the present invention have been described above. Embodiments of the present invention can be implemented in software, hardware or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate the above system and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The system of the present invention can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

Note although several units or sub-units of the system have been mentioned in the above detailed description, such division is merely exemplary and not mandatory. In fact, according to embodiments of the present invention, the features and functions of two or more means described above may be embodied in one means. On the contrary, the features and functions of one means described above may be embodied by a plurality of means. In addition, although in the accompanying drawings operations of the method of the present invention are described in specific order, it is not required or suggested these operations be necessarily executed in the specific order or the desired result be achieved by executing all illustrated operations. On the contrary, the steps depicted in the flowcharts may change their execution order. Additionally or alternatively, some steps may be omitted, a plurality of steps may be combined into one step for execution, and/or one step may be decomposed into a plurality of steps for execution.

Although the present invention has been described with reference to several embodiments, it is to be understood the present invention is not limited to the embodiments disclosed herein. The present invention is intended to embrace various modifications and equivalent arrangements comprised in the spirit and scope of the appended claims. The scope of the appended claims accords with the broadest interpretation, thereby embracing all such modifications and equivalent structures and functions.

We claim:

1. A method for enhancing an image, the method comprising:
    estimating unsharpness of the image;
    determining a protection level of at least one pixel in the image based on the unsharpness, wherein the protection level is associated with an amount of modification for enhancing the image at a low light condition or a certain fog density; and
    modifying a value of the at least one pixel to enhance the image, an amount of the modifying being determined at least in part based on the protection level and an adjusted deviation degree of atmospheric light.

2. The method of claim 1, wherein estimating unsharpness of the image comprises:
    extracting spatial structure information from the image; and
    estimating the unsharpness based on the image and the spatial structure information.

3. The method of claim 2, wherein extracting spatial structure information from the image comprises:
    filtering the image using a first filter of a first size to obtain a first intermediate image;
    filtering the image using a second filter of a second size to obtain a second intermediate image, which second size is greater than the first size; and
    calculating a difference between the first intermediate image and the second intermediate image as the spatial structure information.

4. The method of claim 3, wherein estimating the unsharpness based on the image and the spatial structure information comprises:
    removing the spatial structure information from the second intermediate image to generate a corrected image; and
    calculating an average of pixels with brightness greater than a threshold in the corrected image as the unsharpness.

5. The method of claim 1, wherein the image is a frame in a video, the method further comprising:
    updating the unsharpness of the image using the unsharpness of at least one frame before the image in the video.

6. The method of claim 1, wherein determining a protection level of at least one pixel in the image based on the unsharpness comprises:
    calculating an adjusting factor for the at least one pixel based on the value of the at least one pixel and the unsharpness, the adjusting factor at least indicating a probability for the at least one pixel belonging to an unclear area in the image.

7. The method of claim 6, wherein modifying a value of the at least one pixel comprises:
    estimating transmission information of the atmospheric light at the at least one pixel;
    calculating a deviation degree between the atmospheric light at the at least one pixel and a real scene radiance based on the value of the at least one pixel, the unsharpness, and the transmission information;
    adjusting the deviation degree using the adjusting factor; and
    modifying the value of the at least one pixel based on the adjusted deviation degree and the atmospheric light.

8. The method of claim 1, further comprising:
    iteratively estimating atmospheric light of the image using a plurality of seeds randomly distributed in the image for the modifying of the value of the at least one pixel.

9. The method of claim 8, wherein the image is a frame in a video, the method further comprising:
    updating the atmospheric light of the image using the atmospheric light of at least one frame before the image in the video.

10. The method of claim 1, wherein the unsharpness of the image is a density of at least one of fog and darkness in the image.

11. An apparatus for enhancing an image, the apparatus comprising:
    at least one controller and at least one memory including a computer program code, wherein the at least one memory including the computer program code is configured, with the at least one controller, to cause the apparatus to:
    estimate unsharpness of the image;
    determine a protection level of at least one pixel in the image based on the unsharpness, wherein the protection level is associated with an amount of modification for enhancing the image at a low light condition or a certain fog density; and
    modify a value of the at least one pixel to enhance the image, an amount of the modifying being determined at least in part based on the protection level and an adjusted deviation degree of atmospheric light.

12. The apparatus of claim 11, wherein the computer program code are configured, with the at least one controller, to further cause the apparatus to:
    extract spatial structure information from the image; and
    estimate the unsharpness based on the image and the spatial structure information.

13. The apparatus of claim 12, wherein the computer program code are configured, with the at least one controller, to further cause the apparatus to:
    filter the image using a first filter of a first size to obtain a first intermediate image;
    filter the image using a second filter of a second size to obtain a second intermediate image, which second size is greater than the first size;
    calculate a difference between the first intermediate image and the second intermediate image as the spatial structure information.

14. The apparatus of claim 13, wherein the computer program code are configured, with the at least one controller, to further cause the apparatus to remove the spatial structure information from the second intermediate image to generate a corrected image, and to calculate an average of pixels with brightness greater than a threshold in the corrected image as the unsharpness.

15. The apparatus of claim 11, wherein the image is a frame in a video, and wherein the computer program code are configured, with the at least one controller, to further cause the apparatus to:
- update the unsharpness of the image using the unsharpness of at least one frame before the image in the video.

16. The apparatus of claim 11, wherein the computer program code are configured, with the at least one controller, to further cause the apparatus to:
- calculate an adjusting factor for the at least one pixel based on the value of the at least one pixel and the unsharpness, the adjusting factor at least indicating a probability for the at least one pixel belonging to an unclear area in the image.

17. The apparatus of claim 16, wherein the computer program code are configured, with the at least one controller, to further cause the apparatus to:
- estimate transmission information of the atmospheric light at the at least one pixel;
- calculate a deviation degree between the atmospheric light at the at least one pixel and a real scene radiance based on the value of the at least one pixel, the unsharpness, and the transmission information;
- adjust the deviation degree using the adjusting factor; and
- modify the value of the at least one pixel based on the adjusted deviation degree and the atmospheric light.

18. The apparatus of claim 11, wherein the computer program code are configured, with the at least one controller, to further cause the apparatus to:
- iteratively estimate atmospheric light of the image using a plurality of seeds randomly distributed in the image for the modifying of the value of the at least one pixel.

19. The apparatus of claim 18, wherein the image is a frame in a video, and wherein the computer program code are configured, with the at least one controller, to further cause the apparatus to the apparatus:
- update the atmospheric light of the image using the atmospheric light of at least one frame before the image in the video.

20. The apparatus of claim 11, wherein the unsharpness of the image is a density of at least one of fog and darkness in the image.

* * * * *

UNITED STATES PATENT AND TRADEMARK OFFICE
CERTIFICATE OF CORRECTION

PATENT NO. : 9,704,227 B2
APPLICATION NO. : 14/784281
DATED : July 11, 2017
INVENTOR(S) : Li et al.

Page 1 of 1

It is certified that error appears in the above-identified patent and that said Letters Patent is hereby corrected as shown below:

In the Claims

Column 16,
Line 15, Claim 19 "to the apparatus:" should read --to:--.

Signed and Sealed this
Sixth Day of March, 2018

Andrei Iancu
*Director of the United States Patent and Trademark Office*